Figure 3:
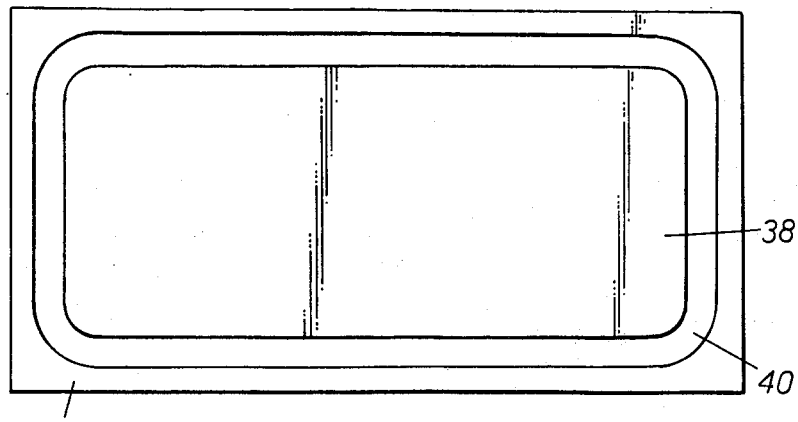

United States Patent [19]
Ennis

[11] 3,711,167
[45] Jan. 16, 1973

[54] HYDROSTATIC BEARINGS

[75] Inventor: Brian Ennis, Halifax, England

[73] Assignee: William Asquith Limited, Halifax, England

[22] Filed: Feb. 16, 1971

[21] Appl. No.: 115,423

[30] Foreign Application Priority Data

July 10, 1970 Great Britain...................33,654/70

[52] U.S. Cl. ..................................308/5 R, 308/9
[51] Int. Cl. .........................................F16c 17/00
[58] Field of Search..........308/5, 9, 122, 3 A; 184/5, 184/100

[56] References Cited

UNITED STATES PATENTS

| | | | |
|---|---|---|---|
| 3,325,229 | 6/1967 | Webb | 308/5 R |
| 3,494,673 | 2/1970 | Wilcox | 308/9 |
| 3,484,064 | 12/1969 | Koenig | 308/5 R |

FOREIGN PATENTS OR APPLICATIONS

| | | |
|---|---|---|
| 1,203,842 | 9/1970 | Great Britain |
| 899,172 | 7/1949 | Germany |
| 1,013,299 | 12/1965 | Great Britain |

*Primary Examiner*—Milton Kaufman
*Assistant Examiner*—Ronald H. Lazarus
*Attorney*—Norris & Bateman

[57] ABSTRACT

A hydrostatic bearing has a pad mounted between the two relatively movable members of the bearing, the pad being free to move perpendicular to the bearing face but restrained against movement in the direction of movement of the movable member of the bearing, there being a substantially continuous sealing element engaging between the inside face of the pad and one of the bearing members, and a second substantially continuous sealing element on the outside face of the pad for engagement with the other bearing member, the area enclosed by the inside sealing element being greater than that enclosed by the outside sealing element and means for admitting fluid under pressure simultaneously to both faces of the pad.

9 Claims, 4 Drawing Figures

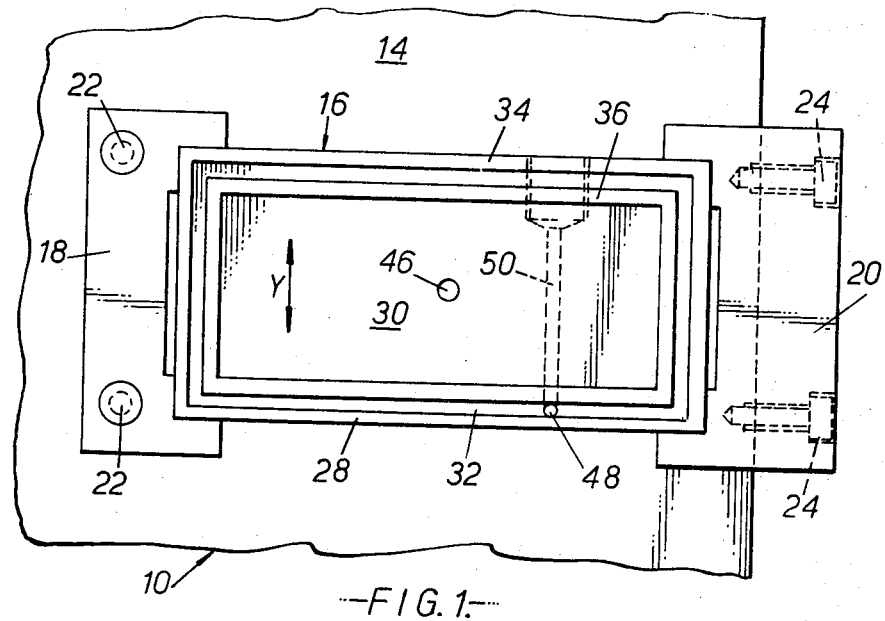
—FIG. 1.—
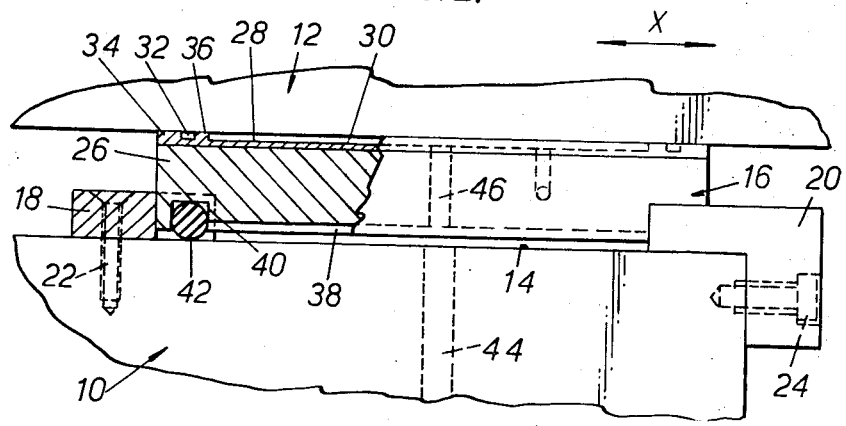
—FIG. 2.—
INVENTOR:
BRIAN ENNIS
BY Norris & Bateman
NORRIS & Batema

INVENTOR:
BRIAN ENNIS

BY Norris & Bateman
NORRIS & BATEMAN.

HYDROSTATIC BEARINGS

This invention relates to floating-pad type hydrostatic bearings, that is to say hydrostatic bearings of the type in which a pad is able to move or "float" within limits between the two relatively moving parts of the bearing. In this type of bearing the pad is usually accommodated in a chamber or pocket in one of the two relatively moving parts, and, in operation is urged towards the other moving part by fluid pressure acting between the base of the chamber or pocket and the inside face of the pad. Since there is a passage through the pad and therefore the fluid pressure at the bearing surface also acts on the outside face of the pad, it is necessary to arrange that the effective area of the inside face is greater than that of the outer face, so that there is a differential force urging the pad outwardly when the hydrostatic bearing is operative.

The present invention provides an improvement in the floating pad type of hydrostatic bearing.

According to this invention a hydrostatic bearing comprises two bearing members relatively to each other; a pad mounted on the first of the two bearing members and restrained against movement in the direction of movement of the second bearing member relatively to the first, but having freedom for some movement in a direction substantially perpendicular to the relative movement between the bearing member; a substantially continuous resilient first sealing element engaging between the inside face of the pad and part of the first bearing member, and enclosing an area on the inside face of the pad; a second substantially continuous sealing element on the outside face of the pad for engagement with the second bearing member, and enclosing an area on the outside face of the pad smaller than the enclosed area on the inside of the pad; a communicating port between the two enclosed areas on opposite sides of the pad, and means for admitting fluid under pressure to the enclosed area on the inside of the pad, whereby when fluid under pressure is supplied to the bearing there is a pressure differential urging the pad towards the second bearing member, the fluid in the outside enclosed area providing the hydrostatic effect, and the escape of fluid from this area being inhibited by engagement of the second sealing element with the second bearing member.

The second bearing member is preferably made in a hard wearing material such as nylon, because it must sustain a certain rubbing action in use. It is also preferred to provide flat "lands" on the second sealing member for engagement with the second bearing member and a continuous groove may be formed in the face of the second sealing element to collect fluid escaping from the enclosed area on the outside of the pad, a scavenging port being connected into this groove.

According to other preferred features of the invention the first sealing element is located in a groove in the inside face of the pad, and takes the form of a rubber O-ring.

Floating pad hydrostatic bearings are known, but the bearing in accordance with the invention differs from some known bearings, in that the resilient first sealing element engages between the inside face of the pad and an opposed face of the bearing part instead of between a peripheral part of the pad and a bore or other inside wall of a chamber or pocket in the part of the bearing with which the pad is associated.

This difference provides at least two distinct advantages, which are:

1. It is not necessary to mount the pad in a chamber or pocket, it being possible to mount it on a flat face of the part of the bearing, and to provide only location means to prevent lateral displacement of the pad.

2. When the bearing is depressurized, the first sealing element can be arranged to act as a spring resisting the complete collapse of the bearing and preventing the movable part settling on to, and possibly damaging a stationary slideway.

3. It permits the use of rectangular, or other non-circular bearings. With the known arrangements in which the seal surrounds the bearing pad, it is usual to have a circular bearing. A rectangular bearing is to be preferred for some slideway arrangements, and is practicable with the invention, but would present difficulties with the known arrangement.

A further difference from known arrangements is that the second sealing element virtually prevents loss of fluid from the bearing by leakage. This is a fundamental change and presents its own advantages. Thus, in the known type of floating pad there is a small gap between the outside face of the pad and the second bearing member. This gap has to be quite small (usually in the order of two or three thousandths of an inch) so that the outflow of fluid is restricted, because increasing the gap and therefore the flow rate of the fluid gives rise to an increase in the temperature of the fluid, which in turn raises the temperature of the bearing and the moving part of the machine. In some instances the performance of the machine is limited by the rise in temperature created by the escape of fluid from the sides of the bearing(s).

In order to keep the working gap very small it is necessary to make the relatively moving parts of the machine to very close tolerances, and the maintenance of these tolerances becomes difficult on large machines.

It is also necessary to collect the escaping fluid and to channel it back to the pump supplying the hydrostatic bearing. This necessitates the use and maintenance of filters because there is the possibility of the fluid being contaminated, especially on a machine tool.

Figure 4:
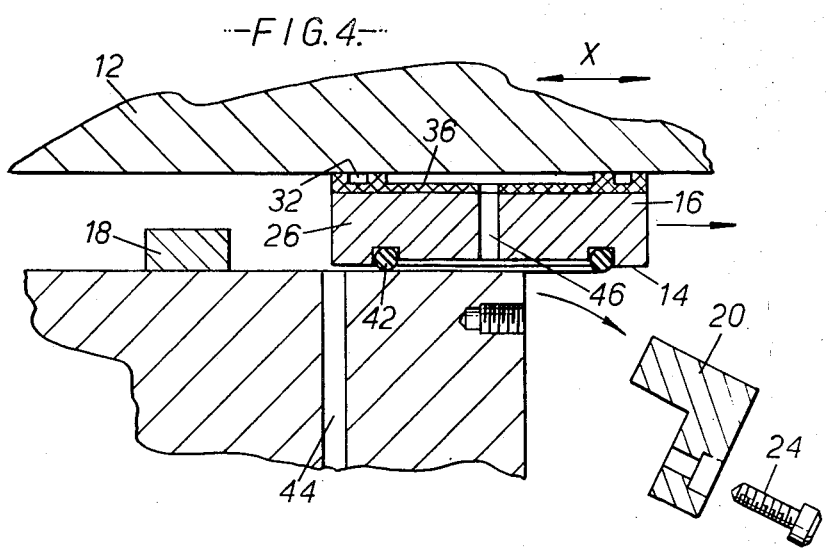

On construction of a floating pad hydrostatic bearing in accordance with the invention will now be described by way of example only, with reference to the accompanying drawings, in which:

FIG. 1 is a plan view of a bearing pad in position on the fixed slideway of a machine tool, FIG. 2 is a partly sectioned elevation of the bearing shown in FIG. 1, FIG. 3 is an underneath plan view of the pad by itself, and FIG. 4 is a view similar to FIG. 2, but showing a method of removing the pad.

A bearing in accordance with the invention can be used in any position on a machine or machine tool where there are two relatively movable parts which call for a bearing to be provided. It will be readily understood by those skilled in the art how the bearing illustrated in the drawings could be applied to other situations, but for the purpose of this example it is supposed that there is a fixed part 10 forming part of a ram housing of a ram-type boring machine, (this being the first bearing member of the invention) and a ram 12 slidable relatively to the part 10 in the direction of arrows 'X' in FIG. 2, (this ram being the second bearing member). The housing and ram are only mentioned as a typical example of a situation in which the bearing can be used, and it is not necessary to give any further description of these parts.

The part 10 has a flat surface 14 on which a floating pad type hydrostatic bearing 16 is located between location blocks 18 and 20. It will be observed that each of the blocks 18 and 20 embraces two corners of the bearing 16, thus locating the bearing against both endwise movement in the direction of the arrows 'X' or lateral movement in the direction of arrows 'Y' (FIG. 1). However, the bearing is a sliding fit vertically within the blocks 18 and 20 for a purpose which will hereinafter appear.

Whereas the locating block 18 is a flat generally rectangular member, the block 20 is angular (see FIG. 2) and engages on a corner of the part 10. Set screws 22 and 24 secures the blocks to the part 10, but whereas the screws 22 pass vertically through the block 28, and are inaccessible once the ram is fitted, the screws 24 extend horizontally and are accessible at an end face of the part 10.

The bearing 16 has a rectangular metal body 26, and a plastics outside seal 28 bonded to its outer face. The seal 28 which is the second sealing element of the invention, is made of a low friction hard wearing material such as nylon, and is in the form of a sheet with a large rectangular recess 30, which defines the effective outside area of the hydrostatic bearing, and a continuous groove 32 extending all round the seal near to its edge. The groove 32 and recess 30 are bounded by two rectangular facings 34 and 36, the outer surface of which are in the same plane.

On its inside, the body 26 is formed with a large substantially rectangular shallow recess 38 with a considerably deeper groove 40 around its edges. A rubber or synthetic rubber O-ring is fitted into the groove 40 and this O-ring is a snug fit between the opposite walls of the groove. The O-ring is the first sealing element of the invention. The groove has rounded corners (see FIG. 3) which enable the O-ring to fit into it without difficulty.

Certain relationships are essential to a proper functioning of the bearing. Firstly the enclosed area on the inside of the O-ring 42 (virtually the area of the recess 38) must be slightly larger than the enclosed area on the inside of the facing 36 (i.e. the area of the recess 30). Secondly the diameter of the O-ring must be such that it projects below the bottom of the body 26 and maintains the bearing pad clear of the top face 14 of the part 10 when the bearing is unloaded (as shown in FIG. 2).

The machine tool is provided with means (not shown) for supplying hydraulic fluid under pressure to the bearing, and there is shown a passage 44 through the part 10 to the area enclosed by the sealing ring 42. In addition there is the usual port 46 through the body 26 of the bearing pad, and in this construction there is an outlet or scavenging port 48 in the groove 32, this port 48 communicating via a hole 50 and a conduit (not shown) with the fluid sump or reservoir of the machine.

When the machine is at rest and no fluid is supplied to the bearing, the ram 12 will rest on the rectangular faces 34 and 36 of the outside seal, and the rubber sealing ring 42 will be compressed due to the weight of the ram. On starting the machine, fluid is supplied via the passage 44 to the bearing 16. This fluid flows into the recess 30 and the pressure of the fluid acts against the underside of the ram 12 in the manner of a hydrostatic bearing. Owing to the differential force on the bearing pad, the latter rises away from the part 10 (thus allowing the O-ring 42 to expand) and this maintains the faces 34 and 36 in engagement with the ram 12. In practice the differential force acting on the pad is only a fraction of the total thrust by the bearing, and consequently the force required to overcome the friction of the ram on the faces 34 and 36 can be very small.

In effect, the bearing may cease to be a true hydrostatic bearing, because the ram is not supported entirely by the liquid pressure, but the bearing can be arranged so that well over 90 percent of the bearing load is taken by the liquid film in the recess 30. The fact that there is some light frictional engagement between the ram 12 and the bearing seal 28 makes it necessary to provide the location blocks 18 and 30 to prevent movement of the bearing in the direction of the arrows X and Y. It will be observed however, that the pad 16 does not fit into a pocket within the part 10, but simply rests on top of that part.

Since the faces 34 and 36 remain in contact with the ram 12, there will be little or no leakage of fluid from the area of the recess 30. A single sealing face surrounding the recess 30 would have this effect, but the provision of the groove 32 dividing the faces 34 and 36 provides a labyrinth effect so that leakage of fluid beyond the outer face 34 is practially eliminated. In fact any liquid leaking across the face 36 becomes so reduced in pressure that it is very unlikely to leak across the face 34. This enables the liquid which does leak into the groove to be collected and returned through the port 48 and the passage 50 to the fluid reservoir.

The labyrinth effect is also very useful in preventing contamination of the fluid. It will be appreciated however, that the greatest advantage of the floating pad hydrostatic bearing is the great reduction in the flow of fluid out of the bearing as compared with the ordinary hydrostatic bearings. This leads to a reduction in the size and cost of the hydraulic equipment — particularly the pump — and a minimizing of undesirable thermal effects.

If it is required to remove the bearing pad for replacement or servicing, it is only necessary to unfasten the screws 24, and then the block 20 can be removed (FIG. 4) and the pad 16 slid off the part 10. This facility arises because of the disposition of the pad on the surface 14 of the part 10, with the fluid "chamber" on the inside defined by the O-ring and the surface 14.

Another advantage of the present arrangement is that the slideways need only be flat and smooth, and not necessarily absolutely square to each other. This is because the pad can rock to a small extent within the limits of the resilient deformation of the O-ring seal to allow the faces 34 and 36 to remain in engagement with the face of the ram 12.

If any particles of grit or metal find their way into the bearing they are likely to become embedded in the relatively soft plastics seal 28, and this will reduce the tendency for them to score the slideway. Furthermore, in the event of a power failure or other shutdown of the machine, the pad 16 will settle down under the weight of the ram, but owing to the existence of the O-ring the ram will remain supported on the plastics seal 28 and will not damage the metal slideways.

What we claim is:

1. A hydrostatic bearing comprising two bearing members movable relatively to each other; a pad mounted on the first of the two bearing members and restrained against movement in the direction of movement of the second bearing member relatively to the first by restraining means, but having freedom for some movement in a direction substantially perpendicular to the relative movement between the bearing members; a substantially continuous resilient first sealing element engaging between the inside face of the pad and part of the first bearing member, and enclosing an area on the inside face of the pad; a second substantially continuous sealing element on the outside face of the pad for engagement with the second bearing member, and enclosing an area on the outside face of the pad smaller than the enclosed area on the inside of the pad, a communicating port between the two enclosed areas on opposite sides of the pad, and means for admitting fluid under pressure to the enclosed area on the inside of the pad, whereby when fluid under pressure is supplied to the bearing there is a pressure differential urging the pad towards the second bearing member, the fluid in the outside enclosed area providing the hydrostatic effect and the escape of fluid from this area being inhibited by engagement of the second sealing element with the second bearing member.

2. A hydrostatic bearing as claimed in claim 1, in which the second sealing element has flat "lands" for engagement with the second bearing member.

3. A hydrostatic bearing as claimed in claim 1, in which said second sealing element defines a continuous groove formed in the face of said second sealing element to collect fluid escaping from the enclosed area on the outside of the pad, said pad having a scavenging port connected into said groove.

4. A hydrostatic bearing as claimed in claim 1, in which said second sealing element is made of wear resistant material, such as nylon.

5. A hydrostatic bearing as claimed in claim 1, in which said first sealing element is located in a groove formed in said pad on the inside face thereof.

6. A hydrostatic bearing as claimed in claim 1, in which said first sealing element is in the form of a resilient 'O' ring.

7. A hydrostatic bearing according to claim 1, wherein at least one detachable location member locates said pad relative said first bearing member, whereby said pad can be released and removed when said location member is detached, without removing one of said bearing members.

8. A hydrostatic bearing according to claim 1, said pad being rectangular, and where in said restraining means comprises bearing blocks fixed to said first bearing member slidably engaging the corners of said pad.

9. A hydrostatic bearing as claimed in claim 1, wherein said pad is mounted on a flat surface of said first bearing member, said first sealing element is a resilient sealing ring engaging said flat surface, and said second sealing element comprises a sheet of hard wear resistant plastic having around its periphery a raised flat surface engaged with said second bearing member.

* * * * *